United States Patent [19]

Lindler

[11] Patent Number: 4,505,815

[45] Date of Patent: * Mar. 19, 1985

[54] MAGNETIC LIQUID TREATING DEVICE

[75] Inventor: Carl Lindler, Summerville, S.C.

[73] Assignee: Descal-A-Matic Corporation, Norfolk, Va.

[*] Notice: The portion of the term of this patent subsequent to Dec. 28, 1999 has been disclaimed.

[21] Appl. No.: 452,985

[22] Filed: Dec. 27, 1982

Related U.S. Application Data

[63] Continuation-in-part of Ser. No. 264,166, May 15, 1981, Pat. No. 4,366,053.

[51] Int. Cl.³ .......................................... B01D 35/06
[52] U.S. Cl. ............................................... 210/223
[58] Field of Search ................................ 210/223, 222

[56] References Cited

U.S. PATENT DOCUMENTS

| | | | |
|---|---|---|---|
| 1,148,990 | 8/1915 | Rogers | 210/223 |
| 2,652,952 | 9/1953 | Vermeiren | 210/222 |
| 2,690,842 | 10/1954 | Spluvak | 210/222 |
| 2,825,464 | 3/1958 | Mack | 210/222 |
| 3,669,274 | 10/1972 | Happ et al. | 210/222 |
| 3,680,705 | 8/1972 | Happ et al. | 210/222 |
| 3,951,807 | 4/1976 | Sanderson | 210/222 |
| 4,153,559 | 5/1979 | Sanderson | 210/222 |
| 4,289,621 | 9/1981 | O'Meara, Jr. | 210/222 |
| 4,357,237 | 11/1982 | Sanderson | 210/222 |
| 4,366,053 | 12/1982 | Lindler | 210/222 |

*Primary Examiner*—Richard V. Fisher
*Assistant Examiner*—Sharon T. Cohen

*Attorney, Agent, or Firm*—Sughrue, Mion, Zinn, Macpeak and Seas

[57] ABSTRACT

An apparatus for the magnetic treatment of liquid containing suspended solids and colloidal particles and dissolved minerals and calcareous materials comprises an inner cylindrical non-ferrous housing adapted to support a plurality of bar magnets therein and an outer cylindrical housing of ferromagnetic material. The inner cylindrical housing is spaced concentrically relative to the outer cylindrical housing by cruciform supports and by a plurality of baffles arranged oppositely and offset from each other. The ends of the inner cylindrical housing are open and supported by the cruciform members and apertures in the housing inward of the ends thereof permit liquid to flow into the space between the cylindrical outer and inner housings. The baffles also serve to cause turbulence and spiral flow motion of liquid between the inner and outer cylindrical housings. The spiral flow motion is imparted to the liquid by staggering the baffles 90° until they complete a 360° turn about the core. The magnet flux field extending outwardly from the bar magnets cuts through the liquid and precipitates the suspended minerals and calcareous materials therein. Thus, the device prevents build-up of scale deposits in liquid systems such as water supply lines, boiler tanks, air conditioners and any other liquid system where it is desirable to maintain the internal surfaces of these systems free of corrosion and scale deposits. Centering tabs at the ends of the inner housing and at the center thereof permit accurate centering of the inner housing within the outer housing.

4 Claims, 10 Drawing Figures

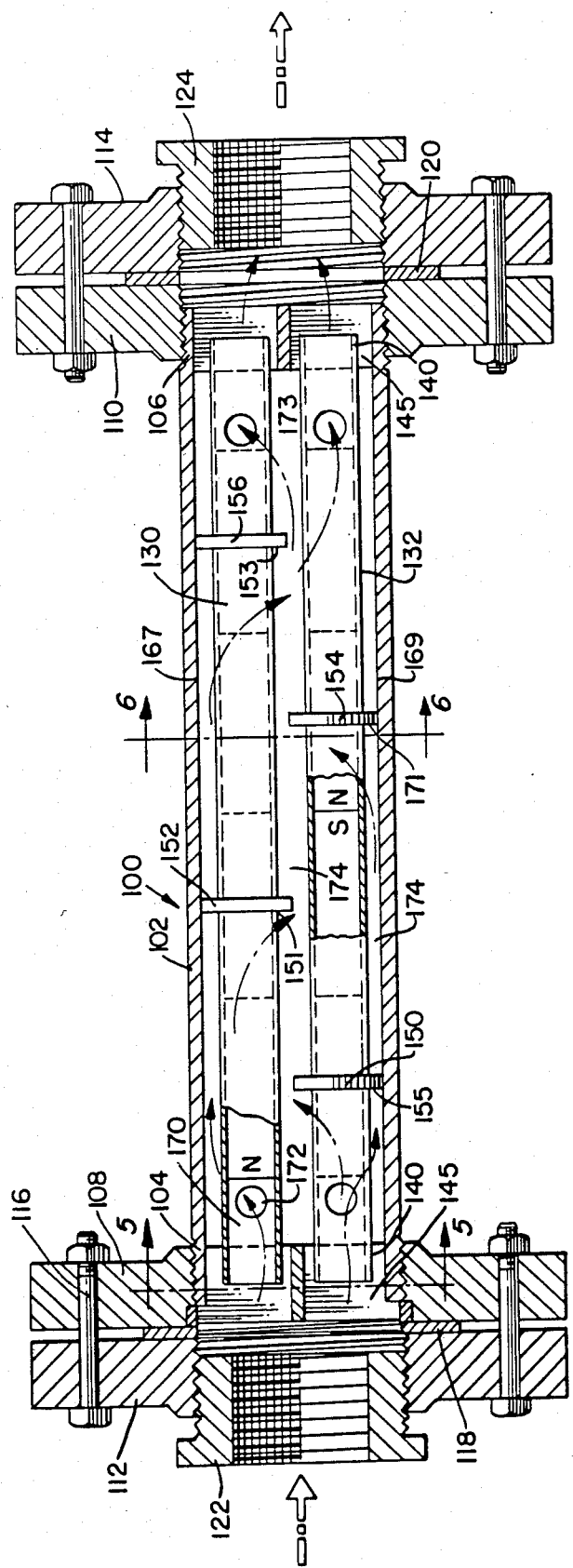
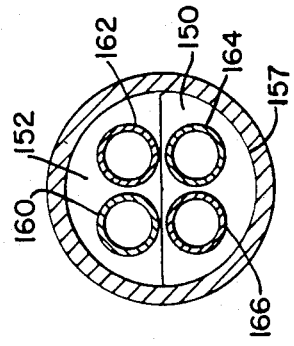
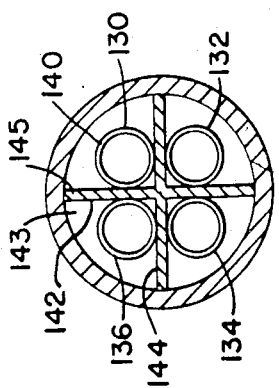

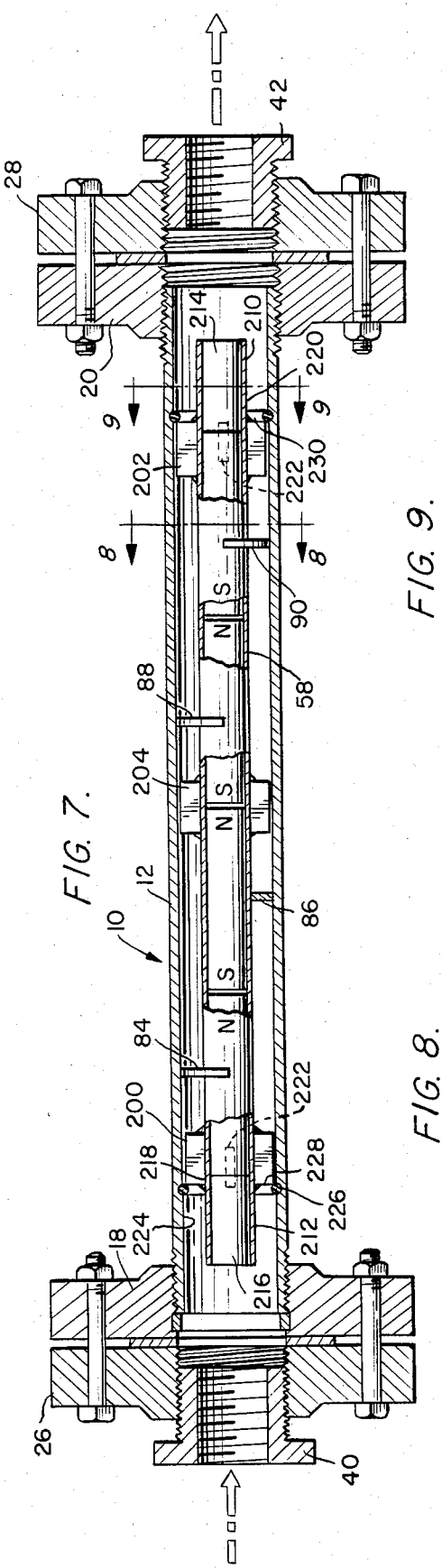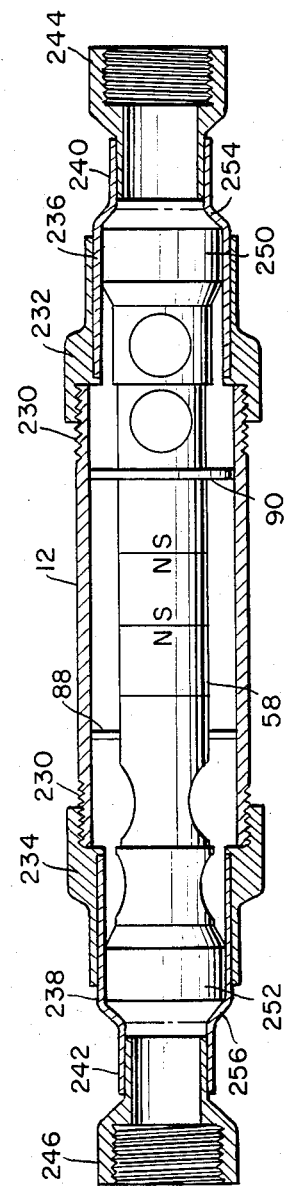
FIG. 7.
FIG. 8.
FIG. 9.
FIG. 10.

MAGNETIC LIQUID TREATING DEVICE

CROSS REFERENCE

This is a continuation-in-part application of application Ser. No. 264,166 filed May 15, 1981 now U.S. Pat. No. 4,366,053. Incorporation of that application is herewith made by reference.

BACKGROUND OF THE INVENTION

1. Field of the Invention

This invention pertains to an apparatus for treating liquid magnetically so as to reduce corrosion and prevent the formation of scales in liquid systems.

2. State of the Prior Art

The prior art relating to this field of invention discloses devices having single or multiple bar magnets which radiate magnetic lines of force into liquid in order to remove minerals in the liquid.

U.S. Pat. Nos. 3,951,807 and 4,153,559 show structures utilizing a single bar magnet having plural longitudinally spaced poles therealong. The magnet is contained within a cylindrical housing which is concentrically positioned with respect to an outher cylindrical housing. Water is directed between the outer and inner cylindrical housings and the magnetic flux field extending from the magnets cuts the water thus acting to reduce scale build-up in the system.

U.S. Pat. Nos. 2,825,464 and 3,669,274 show devices utilizing plural bar magnets contained within a cylindrical housing concentrically positioned with respect to an outer cylindrical housing. The bar magnets are positioned so that their adjacent poles are identical. Spacers are used to space the cylindrical inner housing with respect to the cylindrical outer housing. The spacers serve to cause fluid to flow between the housings in linear and helical flow patterns, respectively.

Unlike the prior art, applicant's invention discloses removable inner and outer cylindrical housings having removable end fittings attached thereto. Further, the ends of the inner housing are supported on cruciform members or copper fittings and baffles are positioned along the inner housing in opposed and offset relationship and extend through one half the inner diameter of the outer housing. Centering tabs are attached to the inner housing at the ends and serve to center the housing within the outer housing. Rings are fitted into recesses in the outer housing near the ends to retain the inner housing in place.

Representative of the prior art are those listed below:

| Patentee | Patent No. | Issue Date |
|---|---|---|
| M. C. Rogers | 1,148,990 | Aug. 3, 1915 |
| F. J. Cox | 1,335,955 | Apr. 6, 1920 |
| K. Spluvak | 2,690,842 | Oct. 5, 1954 |
| S. S. Mack | 2,825,464 | Mar. 4, 1958 |
| G. M. Happ | 3,669,274 | June 13, 1972 |
| C. H. Sanderson | 3,951,807 | Apr. 20, 1976 |
| C. H. Sanderson | 4,153,559 | May 8, 1979 |

SUMMARY OF THE INVENTION

The present invention is designed to prevent build-up of scale in liquid devices by utilizing a plurality of bar magnets to precipitate suspended solids, collodial particles, minerals and calcareous materials in the liquid.

One object of this invention is to provide a device which is easy to construct and simple to install in liquid systems without the need for special tools or skills to do so.

Another object of this invention is to provide a device for the treatment of liquid which utilizes a plurality of bar magnets having their poles alternating throughout the entire lengths of the magnets.

It is still a further object of this invention to provide a device with baffles such that liquid is caused to flow in a spiral path between concentric cylindrical housings.

It is a further object of this invention to cause turbulence of the liquid flowing between the inner cylindrical housing and the outer cylindrical housing.

Yet another object of this invention is to secure centering tabs to a plurality of locations on the inner housing which cooperate with the outer housing for centering purposes. Rings are retained in recesses in the outer housing to retain the inner housing in place. Alternatively, copper fittings are employed instead of cruciforms for centering the inner housing.

These and other objects of the present invention will become apparent from a reading of the specification when considered in light of the annexed drawings.

BRIEF DESCRIPTION OF THE DRAWINGS

FIG. 4 is a perspective view of a modified form of the invention showing use of a plurality of inner cylindrical housings having a plurality of bar magnets contained therein.

FIG. 5 is a view taken along the line 5—5 of FIG. 4 and shows an end cruciform member adapted to support the inner cylindrical housings concentrically within the outer cylindrical housing.

FIG. 6 is a view taken along the line 6—6 of FIG. 4 and shows opposed and offset baffles used to support pairs of inner housings and which function to create turbulence and spiral flow motion of the liquid within the device.

FIG. 7 is a perspective view of an alternative form of the invention showing centering tabs and retainer rings.

FIG. 8 is an end view of the invention taken along the lines of 8—8 of FIG. 7 and shows the baffle members.

FIG. 9 is a similar end view showing the centering tabs and retainer ring.

FIG. 10 is yet another alternative embodiment showing copper fittings used instead of cruciforms to center the inner housing within the outer housing.

DESCRIPTION OF THE PREFERRED EMBODIMENT

Figure 1:
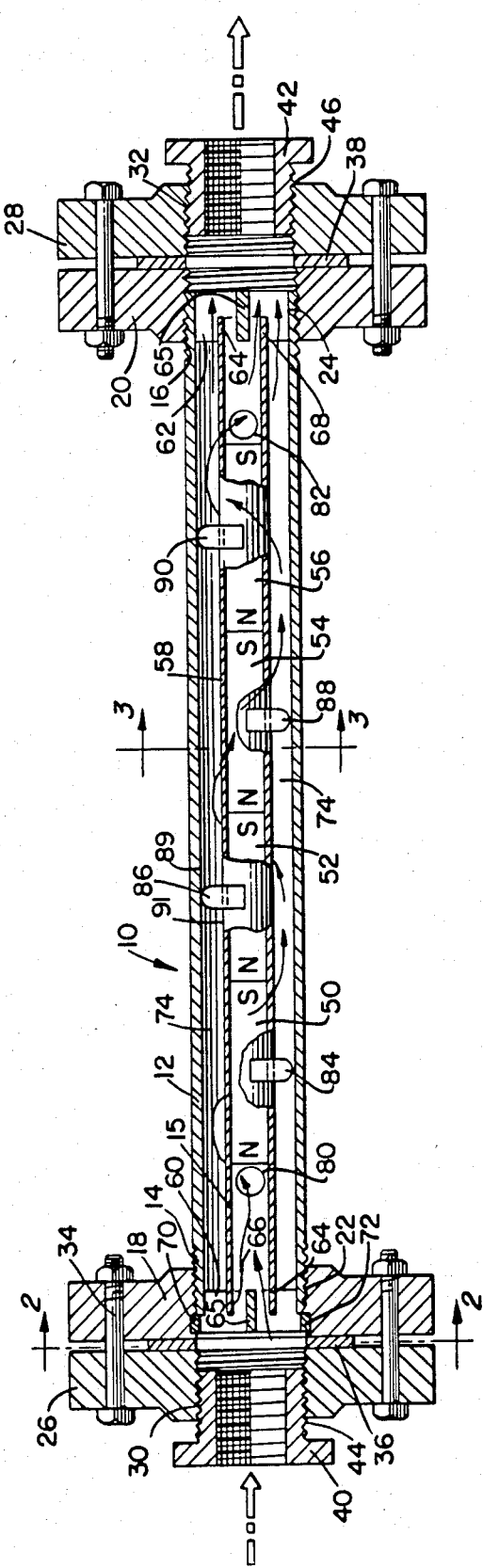
FIG. 1 is a perspective view of the magnetic liquid treating device showing a plurality of bar magnets contained within an inner cylindrical housing and a plurality of baffles designed to cause turbulence and spiral flow motion of the liquid through the device.
Figure 3:
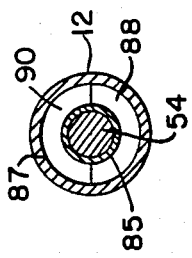
FIG. 3 is a view taken along the line 3—3 of FIG. 1 and shows offset baffles used to create turbulence and spiral flow motion through the device, the baffle also serve to support the inner cylindrical housing concentrically within the outer cylindrical housing.
Figure 2:
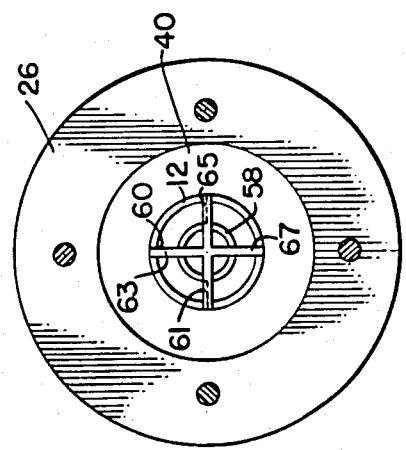
FIG. 2 is a view taken along the line 2—2 of FIG. 1 and shows an end cruciform member adapted to support the inner cylindrical housing concentrically within the outer cylindrical housing.

Referring in more detail to the drawings, numeral 10 discloses a magnetic liquid treating device according to the present invention. The device 10 includes an outer cylindrical housing 12 made of ferromagnetic material such as iron, nickel or cobalt which exhibits high magnet permeability and high resistance to corrosion. The ends 14 and 16 of the outer cylindrical housing 12 are threaded so as to receive inner fittings 18 and 20 having internal threads 22 and 24. Outer fittings 26 and 28 have internal threads 30 and 32 and are bolted to the innter fittings 18 and 20 by bolts 34. Washers 36 and 38 are positioned between the fittings 18, 20 and 26, 28 to seal the joints and prevent liquid leaks. End connections 40 and 42 having external threads 44 and 46 are threaded into the internally threaded outer fittings 26 and 28. The end connections 40 and 42 are internally threaded and serve to connect the device to a desired liquid flow system such as a water line, air conditioner, humidifier, coffee maker or any other liquid flow system where it is desired to control scale and corrosion in liquid systems.

A plurality of bar magnets 50, 52, 54 and 56 are positioned within the inner cylindrical housing 58. Inner cylindrical housing 58 is constructed from non-magnetic material such as copper, plastic, brass or the like and chosen to exhibit high resistance to corrosion. The plurality of bar magnets are positioned within the inner cylindrical housing 58 such that their magnetic poles alternate from North to South and South to North throughout the entire lengths of the inner cylindrical housings. This arrangement has been determined to be advantageous in that the magnetic force field extending from the magnets cuts through the liquid thus acting precipitously on minerals contained in the liquid. Further, when the poles of the magnets are alternated as shown, the magnetic force field radiating outwardly from the magnets appears to exhibit greater concentration near the South and North poles thus having a greater effect on the minerals in the liquid.

The inner cylindrical housing 58 is concentrically positioned within the outer cylindrical housing 12 by means of a pair of cruciform members 60 and 62. Each leg 61, 63, 65 and 67 of each of the cruciform members has an arcuate slot 64 (one shown) as best seen in FIG. 1. The ends 66 and 68 of the inner cylindrical housing 58 are pressed fitted into the arcuate slots 64 so as to be tightly retained therein. The cruciform member 60 is telescoped into the end 14 of the outer cylindrical housing so as to be tightly retained therein. A flange 70 on the cruciform member 60 abuts against the outer edge 72 of end 14 of the outer cylindrical housing 12. On the other hand, the opposite cruciform member 62 is in the form of a plug, i.e., all of its diameter being equal which fits within the end 16 of the outer cylindrical housing 58. By this construction, the inner cylindrical housing 58 is concentrically positioned within the outer cylindrical housing 12 so that the space 74 therebetween defines a liquid passage extending between and through the length of the housings. Liquid entering through end connector 40 flows through the spaces between the legs of the cruciform member 60 as well as through aperture 80 near the end 15 of the inner cylindrical housing. The aperture 80 permits liquid trapped within the end of the inner cylindrical housing to flow into the space 74. An aperture 82 near the end 17 of the inner housing permits liquid to flow out of the open end of the inner housing.

Additional supports in the form of semi-circular baffles 84, 86, 88 and 90 are provided. The baffles are secured to the outer periphery 91 of the inner cylindrical housing and arranged in offset and diametrically opposed relationship, alternating along the length of the inner cylindrical housing between the apertures 80 and 82. The baffles have arcuate inner edges 85 which function as cradles for the inner housing. The baffles are secured by suitable means to the periphery 91 of the inner cylindrical housing with the opposite arcuate 87 ends abutting against the inner surface 89 of the outer cylindrical housing. The baffles function to create a spiral flow of liquid therebetween and within the space 74. It is thought that the magnetic force fields emanating from the bar magnets have greater effects on suspended and dissolved materials due to the spiral flow of liquid as opposed to the effects of the magnetic force field on liquid flowing in a linear fashion. Further, the baffles also serve to create turbulence as well as spiral motion such that the magnetic fields acting thereon appear to have a greater precipitous effect on the suspended and dissolved materials in the liquid.

The outer cylindrical housing 12 is ferromagnetic and thus exhibits high magnetic permeability. The inner cylindrical housing 58 is non-ferrous, thus the magnet fields extend diagonally across the inner diameter of the outer cylindrical housing. The outer cylindrical housing acts as a conductor for the magnetic fields so as to maintain the magnet fields within the inner diameter of the outer cylindrical housing. Due to the alternating arrangement of the magnetic poles of the plurality of bar magnets, greater field density is achieved adjacent to and in proximity to the South/South and North/North poles of adjacent magnets. This provides greater precipitous effects on the suspended and dissolved materials in the liquid. The precipitation takes place in the water system where velocities are lowest and the precipitate can be removed or dumped through normal means.

To accommodate larger liquid flow systems, the embodiment shown in FIGS. 4-6 is provided. In this case, the unit is generally designated 100 and includes an outer cylindrical housing 102 of ferromagnetic material. The ends 104 and 106 of housing 102 are threaded and are adapted to receive inner fittings 108 and 110. Outer fittings 112 and 114 are secured to the inner fittings by bolts 116. Washers or the like 118 and 120 are positioned between the fittings 108, 112 and 106, 114 to prevent leaks. End connectors 122 and 124 are threaded into the internally threaded outer fittings 112 and 114. These end connectors which are internally threaded serve to connect the unit to a liquid flow system.

Unlike unit 10, unit 100 is provided with a plurality of inner cylindrical housings 130, 132, 134 and 136 as best seen in FIG. 6. Each inner cylindrical housing has a plurality of bar magnets positioned therein. The poles of the various magnets alternate from North to South/South to North/North along the entire lengths of the magnets. Each end 140 of each inner cylindrical housing is supported in each quadrant 143 of cruciform support members 145 as best seen in FIG. 5. The ends 140 of each of the inner cylindrical housings may be welded or otherwise secured to the walls 142 and 144 of the cruciform members 145 so as to prevent their vertical or horizontal movement within the outer cylindrical housing. Baffles 150, 152, 154 and 156 are provided along the lengths of the inner cylindrical housings. The baffles have a plurality of apertures 160, 162, 164 and 166 cut therein so as to accommodate each of the inner cylindrical housings. The baffles are staggered 90° until they complete a 360° turn about the core(s). This arrangement functions to cause spiral flow motion of the liquid as it travels through the device. The baffles have arcuate edges 157 (one shown) which rests against the inner periphery of outer housing 102. The baffles alternate as seen in FIG. 4 and this arrangement serves to cause the fluid to flow in a spiral flow pattern within the space 174. Further, the baffles serve to cause turbulence in the flow of liquid as it strikes the faces 151, 163, 155 and 171 thereof. The effect of the magnetic fields of the magnets have a greater effect on the liquid due to the turbulence of the liquid within the space 174. As above, and as can be seen in FIG. 6, the baffles are semi-circular in form with their major diameters corresponding to the inner diameter of the outer cylindrical housing.

In operation, and with respect to FIG. 1, fluid enters the unit 10 as indicated by the arrow and flows through the spaces between the legs of the cruciform 60 and into the space 74 defined by the inner cylindrical housing and the outer cylindrical housing. Some liquid flows into the end of the inner cylindrical housing and through the aperture 80 into the space 74 to combine with the other liquid. The liquid passes through the space 74 in a spiral motion which is caused by the oppositely arranged and offset baffles. The baffles further cause turbulence of the liquid as it passes through the unit. The magnetic fields from the bar magnets extend through the inner diameter of the outer cylindrical housing thus cutting the liquid flowing therethrough. The magnetic fields are strongest at the poles of adjacent magnets. The effect of these magnetic fields on the liquid causes precipitation of suspended and dissolved materials within the liquid. Liquid thus conditioned flows through the aperture 82 and through the spaces between the legs of cruciform 62. The liquid flows out the end connector 42 to continue through the system.

With respect to unit 100, liquid flows into the unit in the direction of the arrow and passes through the cruciform support 145 and into the space 174 between the plurality of inner cylindrical housings. The liquid flows over and around the baffles in a spiraling fashion. The baffles also cause turbulence of the liquid as it flows from one end of the unit to the other. Therefore the combination of spiraling and turbulence causes uniform treatment of the liquid under all system flow conditions,— low to high flows, with a minimum of pressure drop. The magnetic fields of the bar magnets extend across the inner diameter of the outer cylindrical housing and cuts the liquid flowing through the space 174. The magnetic fields are strongest at the poles of adjacent bar magnets. The magnetic fields thus produced cause precipitation of suspended and dissolved materials in the liquid.

An alternative embodiment is shown in FIGS. 7-10. FIG. 7 shows the outer housing 12 and inner fittings 18 and 20 on the ends thereof. End tabs 200 and 202 are used to center the inner housing 58 within the outer housing 12. Additional centering tabs 204 are located about midway of the ends of the inner housing 58. The centering tabs 200 and 202 are welded to the outer periphery 206, FIG. 9, and extend outwardly to and abut the inner periphery 208 of the outer housing 12. The centering tab midway of the ends of the ends of the inner housing 58 also extend to and abut the inner wall of the outer housing.

Plugs 210 and 212 having closed ends 214 and 216 are inserted into the ends 218 and 220 of the inner housing. These plugs have extension members 222 which abut against the magnets to keep them in place within the inner housing. The inner surface 224 of the outer housing is recessed at 226 near the end thereof to receive retaining rings 228 and 230 in a snug fitting fashion. These rings are positioned adjacent the tabs 200 and 202 and function to retain the inner housing in place.

The outer fittings 26 and 28 and the end connections 40 and 42 function to facilitate connecting the device to a liquid conveying system.

An additional embodiment is shown in FIG. 10 and comprises the outer housing 12 having threaded ends 230 for receiving pipe connections 232 and 234. The pipe connections 232 and 234 have inner pipe connections 236 and 238 which extend outwardly to reduction portions 240 and 242. The reduction portions 240 and 242 secure additional pipe connections 244 and 246 which are internally threaded to facilitate connecting the device to a liquid conveying system.

The inner housing 58 contains the magnets and baffles as previously described. The inner housing has copper fittings 250 and 252 of bell-like configuration which serves to center the inner housing 58 within the outer housing 12. The bell-like fittings 250 and 252 seat in the pipe fittings 236 and 238 adjacent shoulders 254 and 256.

While the outer cylindrical housing 12 is designed to be resistent to corrosion, there may come a time when, due to damage, it may be necessary to replace it. This can be easily done by removing the end fittings from the threaded ends of the outer housing and withdrawing the inner cylindrical housing out of the outer housing. This is advantageous also in that should the inner cylindrical housing become damaged, it too may be easily replaced. Further, this construction permits easy cleaning of debris from the core.

Although the invention has been described in detail with respect to its construction and operation in the embodiment shown, it is intended that the present disclosure of the preferred embodiment has been made only as an example and that numerous changes in the construction may be resorted to without departing from the spirit and scope of the invention claimed herein below so that it may be adaptable to other and diverse uses.

What is claimed is:

1. A magnetic liquid treating device comprising:

an outer cylindrical housing having outer ends and outer and inner walls;

inner fittings removably attached to the outer ends of the outer cylindrical housing;

outer fittings removably attached to the inner fittings;

end connections removably attached to the outer fittings;

an inner cylindrical housing having inner and outer walls and having openings in the ends thereof;

a plurality of magnets contained within the inner cylindrical housing, said plurality of magnets being arranged longitudinally and in axial alignment with each other and arranged such that like poles are adjacent each other;

end plugs in the ends of the inner cylindrical housing to retain said magnets therein;

means secured to the inner cylindrical housing and extending to the inner wall of the outer cylindrical housing for centering the inner cylindrical housing within the outer cylindrical housing;

rings in recesses in the inner wall of the outer cylindrical housing abutting the centering means for retaining the inner cylindrical housing within the outer cylindrical housing, and a plurality of semi-circular baffles in spaced apart relationship from each other extending along the length of the inner housing, each of said semi-circular baffles extending through one half of the inner diameter of the outer cylindrical housing, said plurality of semi-circular baffles staggered at 90° relative to each other and completing a 360° turn between the outer and inner housings whereby liquid passing through spaces between the inner cylindrical housing and the outer cylindrical housing flows in a spiral and turbulent motion and whereby the magnetic fields extending from like poles of adjacent magnets extend between the baffles and cut the liquid causing precipitation of the minerals in the liquid.

2. A magnetic liquid treating device as defined in claim 1, wherein:
said centering means comprises a plurality of outwardly extending tabs secured about the periphery of the inner cylindrical housing near the ends thereof and midway of the ends thereof, said tabs extending to and abutting the inner wall of the outer cylindrical housing whereby said inner cylindrical housing is positioned concentrically and in axial alignment with the outer cylindrical housing.

3. A magnetic liquid treating device comprising:
an outer cylindrical housing having outer ends and outer and inner walls;
inner fittings removably attached to the outer ends of the outer cylindrical housing;
inner connections on the inner fittings having reduced outer portions;
outer fittings secured to the inner fittings, said outer fittings for securing the device to a liquid conveying system;
an inner cylindrical housing having inner and outer walls and having apertures near the ends thereof;
a plurality of magnets contained within the inner cylindrical housing between the apertures, said plurality of magnets being arranged longitudinally and in axial alignment with each other and arranged such that like poles are adjacent each other;
means secured to the inner cylindrical housing and seated in the inner connections adjacent the reduced outer portions to center the inner cylindrical housing within the outer cylindrical housing; and
a plurality of semi-circular baffles in spaced apart relationship from each other extending along the length of the inner housing, each of said semi-circular baffles extending through one half of the inner diameter of the outer cylindrical housing, said plurality of semi-circular baffles staggered at 90° relative to each other and completing a 360° turn between the outer and inner housings whereby liquid passing through spaces between the inner cylindrical housing and the outer cylindrical housing flows in a spiral and turbulent motion and whereby the magnetic fields extending from like poles of adjacent magnets extend between the baffles and cut the liquid causing percipitation of the minerals in the liquid.

4. A magnetic liquid treating device as defined in claim 3, wherein:
said means being bell-like pipe fittings.

* * * * *

UNITED STATES PATENT AND TRADEMARK OFFICE
CERTIFICATE OF CORRECTION

PATENT NO. : 4,505,815

DATED : March 19, 1985

INVENTOR(S) : Carl Lindler

It is certified that error appears in the above-identified patent and that said Letters Patent is hereby corrected as shown below:

The order of the poles of the magnets are as follows:

N SS NN S. This is the correct order throughout figures 1, 4, 7 and 10.

Signed and Sealed this

Seventeenth Day of September 1985

[SEAL]

Attest:

DONALD J. QUIGG

Attesting Officer

Commissioner of Patents and
Trademarks—Designate